United States Patent
Hong et al.

(10) Patent No.: US 12,422,935 B2
(45) Date of Patent: *Sep. 23, 2025

(54) GESTURE INFORMATION PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Xiaolin Hong, Shenzhen (CN); Qingqing Zheng, Shenzhen (CN); Xinmin Wang, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 19 days.

This patent is subject to a terminal disclaimer.

(21) Appl. No.: 18/227,857

(22) Filed: Jul. 28, 2023

(65) Prior Publication Data

US 2023/0376120 A1 Nov. 23, 2023

Related U.S. Application Data

(63) Continuation of application No. 17/580,545, filed on Jan. 20, 2022, now Pat. No. 11,755,121, which is a (Continued)

(30) Foreign Application Priority Data

Jan. 13, 2020 (CN) .................. 202010033904.X

(51) Int. Cl.
*G06F 3/01* (2006.01)
*G06N 3/045* (2023.01)
*G06T 5/70* (2024.01)

(52) U.S. Cl.
CPC ............. *G06F 3/017* (2013.01); *G06N 3/045* (2023.01); *G06T 5/70* (2024.01); *G06T 2207/20081* (2013.01); *G06T 2207/20084* (2013.01)

(58) Field of Classification Search
CPC .......... G06F 3/017; G06F 3/014; G06F 3/015; G06F 18/2415; G06F 2218/08;
(Continued)

(56) References Cited

U.S. PATENT DOCUMENTS 11,755,121 B2 * 9/2023 Hong .................. G06V 40/28
345/156
2013/0046715 A1 2/2013 Castermans et al.
(Continued)

FOREIGN PATENT DOCUMENTS

CN 108491077 A 9/2018
CN 109213305 A * 1/2019
(Continued)

OTHER PUBLICATIONS

Deep Learning for Electromyographic Hand Gesture Signal Classification Using Transfer Learning Ulysse Côté-Allard , Cheikh Latyr Fall , , IEEE Transactions On Neural Systems and Rehabili (Year: 2019).*

(Continued)

*Primary Examiner* — Grant Sitta
(74) *Attorney, Agent, or Firm* — Morgan, Lewis & Bockius LLP

(57) ABSTRACT

This application provides a gesture information processing method and apparatus, an electronic device, and a storage medium. The method includes: acquiring an electromyography signal sample generated by an electromyography signal collection target object in connection with performing multiple gestures; dividing the electromyography signal (Continued)

sample through a sliding window having a fixed window value and a fixed stride into different electromyography signals of the target object; and applying the different electromyography signals to a first neural network model to determine gesture information matching the multiple gestures performed by the target object.

20 Claims, 13 Drawing Sheets

Related U.S. Application Data continuation of application No. PCT/CN2020/130567, filed on Nov. 20, 2020.

(58) Field of Classification Search
CPC ............ G06F 2218/04; G06F 2218/12; G06F 18/241; G06N 3/045; G06N 3/08; G06N 3/084; G06N 3/047; G06T 5/70; G06T 2207/20081; G06T 2207/20084; Y02P 90/30; G06V 10/77; G06V 10/82; G06V 40/28; G06V 40/15
See application file for complete search history.

(56) References Cited

U.S. PATENT DOCUMENTS

| | | | |
|---|---|---|---|
| 2015/0156545 A1* | 6/2015 | Kveton | ............ H04N 21/44218 725/14 |
| 2020/0349439 A1* | 11/2020 | Luo | ......................... G06F 17/15 |
| 2020/0356178 A1 | 11/2020 | Qiu et al. | |

FOREIGN PATENT DOCUMENTS

| | | |
|---|---|---|
| CN | 110399846 A | 11/2019 |
| CN | 110610172 A | 12/2019 |
| CN | 110658915 A | 1/2020 |
| CN | 111209885 A | 5/2020 |

OTHER PUBLICATIONS

Tencent Technology, ISRWO, PCT/CN2020/130567, Feb. 22, 2021, 7 pgs.
Tencent Technology, IPRP, PCT/CN2020/130567, Jul. 19, 2022, 6 pgs.
Yu Du et al., "Surface EMG-Based Inter-Session Gesture Recognition Enhanced by Deep Domain Adaptation", Sensors 2017, Feb. 24, 2017, MDPI, 22 pgs.

* cited by examiner

CNN ARCHITECTURE PROPOSED

| Layer | Kernel HxW | # Filters Stride / Padding, [Up, Down, Left, Right] |
|---|---|---|
| Input | | 101 x 20 x 8 |
| Convolution + BN | 3x3 | F = 32<br>S = 1 / P = [1,1,1,1] |
| Convolution + BN | 3x3 | F = 32<br>S = 1 / P = [1,0,1,1] |
| MaxPooling | 2x2 | S = 2 |
| Convolution + BN | 3x3 | F = 64<br>S = 1 / P = [0,0,1,1] |
| MaxPooling | 2x2 | S = 2 |
| Convolution + BN | 3x3 | F = 128<br>S = 1 / P = [1,1,1,0] |
| MaxPooling | 2x2 | S = 2 |
| Convolution + BN | 1x1 | F = 128<br>S = 1 / P = [0,0,0,0] |
| MaxPooling | 2x2 | S = 2 |
| Fully Connected | | 1024 |
| Dropout | | 50% Disconnection |
| Fully Connected | | 2048 |
| Dropout | | 50% Disconnection |
| Fully Connected | | 6 |
| SoftMax Classification | | |

FIG. 3

GESTURE INFORMATION PROCESSING METHOD AND APPARATUS, ELECTRONIC DEVICE, AND STORAGE MEDIUM

CROSS-REFERENCE TO RELATED APPLICATIONS

This application is a continuation application of U.S. patent application Ser. No. 17/580,545, entitled "GESTURE INFORMATION PROCESSING METHOD AND APPARATUS, ELECTRONIC DEVICE, AND STORAGE MEDIUM" filed on Jan. 20, 2022, which is a continuation application of PCT Patent Application No. PCT/CN2020/130567, entitled "GESTURE INFORMATION PROCESSING METHOD AND APPARATUS, ELECTRONIC DEVICE, AND STORAGE MEDIUM" filed on Nov. 20, 2020, which claims priority to Chinese Patent Application No. 202010033904.X, filed with the State Intellectual Property Office of the People's Republic of China on Jan. 13, 2020, and entitled "GESTURE INFORMATION PROCESSING METHOD AND APPARATUS, ELECTRONIC DEVICE, AND STORAGE MEDIUM", all of which are incorporated herein by reference in their entirety.

FIELD OF THE TECHNOLOGY

This application relates to information processing technologies, and in particular, to a gesture information processing method and apparatus, an electronic device, and a storage medium.

BACKGROUND OF THE DISCLOSURE

Gestures are the most basic way of human communication, through which different actions may be realized. Electromyography signals are superposition of motor unit action potentials (MUAPs) in numerous muscle fibers in time and space. According to different recording manners, electromyography signals recorded by an electromyography may be classified into surface electromyography signals and needle electromyography signals, all of which include anatomical and physiological properties of muscles. The surface Electromyography (sEMG) signals are a combined effect of superficial muscle electromyography signals and nerve stem electrical activities on skin surfaces, which can reflect neuromuscular activities to some extent. Compared with the needle electromyography signals, the surface electromyography signals have advantages such as non-invasiveness and simple operation in measurement. Thus, the surface electromyography signals have important application values in clinical medicine, rehabilitation medicine, human-computer interfaces and the like. Conventional electromyography-based gesture recognition technologies generally use gesture recognition of visual sensors (such as ordinary cameras or depth cameras) and are based on wearable sensors (such as data gloves). However, due to the inconvenience and delay of recognition, the wearable sensors cannot timely and accurately recognize users' gestures.

SUMMARY

In view of the above, embodiments of this application provide a gesture information processing method and apparatus, an electronic device, and a storage medium, so as to accurately and timely recognize gesture information in different usage environments and have stronger robustness for automatically extracted electromyography signals, thereby improving accuracy of classification of surface electromyography signals and reducing interference of noise with gesture information recognition.

Technical solutions in the embodiments of this application are implemented as follows.

The embodiments of this application provide a gesture information processing method performed by an electronic device, the method including:
  determining an electromyography signal collection target object in a gesture information usage environment of a gesture recognition model;
  acquiring an electromyography signal sample matching the electromyography signal collection target object, and a corresponding gesture information label;
  dividing the electromyography signal sample through a sliding window having a fixed window value and a fixed stride into different electromyography signals of the target object, and denoising the different electromyography signals of the target object;
  recognizing the denoised different electromyography signals based on the gesture information label, and determining probabilities of gesture information represented by the different electromyography signals; and
  weighting the probabilities of the gesture information represented by the different electromyography signals, so as to determine gesture information matching the target object.

The embodiments of this application further provide a gesture information processing apparatus, including:
  an information processing module configured to determine an electromyography signal collection target object in a gesture information usage environment of a gesture recognition model;
  a first information transmission module configured to acquire an electromyography signal sample matching the electromyography signal collection target object, and a corresponding gesture information label;
  the information processing module being configured to divide the electromyography signal sample through a sliding window having a fixed window value and a fixed stride into different electromyography signals of the target object, and denoise the different electromyography signals of the target object;
  the information processing module being configured to recognize the denoised different electromyography signals based on the gesture information label, and determine probabilities of gesture information represented by the different electromyography signals; and
  the information processing module being configured to weight the probabilities of the gesture information represented by the different electromyography signals, so as to determine gesture information matching the target object.

The embodiments of this application further provide an electronic device, comprising:
  a memory configured to store executable instructions; and
  a processor configured to perform the gesture information processing method when running the executable instructions stored in the memory.

The embodiments of this application further provide a non-transitory computer-readable storage medium, storing executable instructions, the gesture information processing method being performed when the executable instructions are executed by a processor.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

FIG. 3 is a schematic diagram of a process of generating gesture information in a conventional solution;

DESCRIPTION OF EMBODIMENTS

Figure 1:
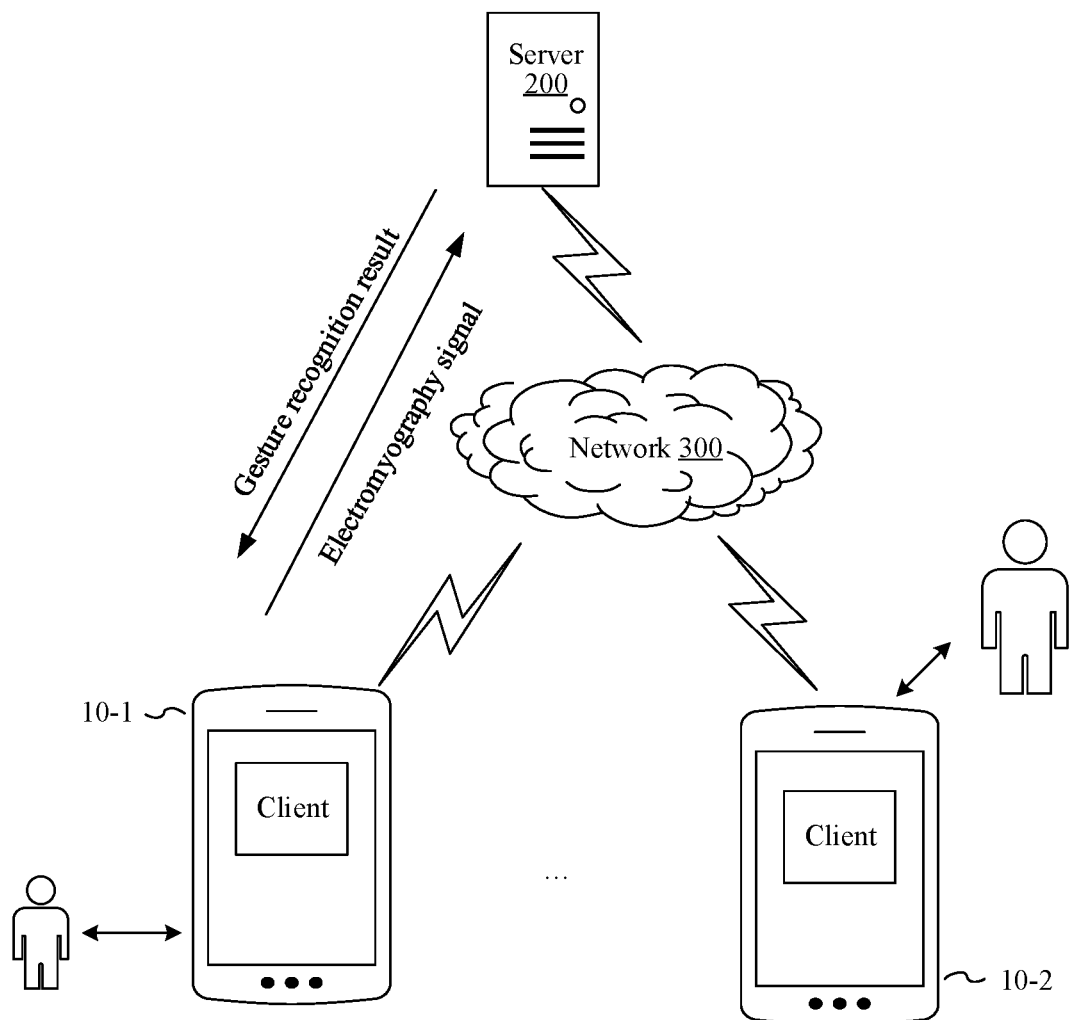
FIG. 1 is a schematic diagram of an application environment of a gesture recognition model according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of this application are further described in detail, a description is made on nouns and terms involved in the embodiments of this application, and the nouns and terms involved in the embodiments of this application are applicable to the following explanations.

1) An "artificial neural network", Neural Network (NN) for short, is a mathematical model or computational model that imitates structures and functions of biological neural networks in fields of machine learning and cognitive science, for estimating or approximating functions.

2) A "model parameter" is a quantity to use a generic variable to establish a relationship between functions and variables. In the artificial neural network, the model parameter is generally a real matrix.

3) An "sEMG" refers to a muscle biograph obtained by measuring and recording bioelectricity of surface muscles through a special electromyography or polygraph.

4) A "residual network (ResNet)" is a deep feedforward neural network that introduces skip connections to achieve identity mapping.

5) A "contrastive loss" may learn a mapping relation, which enables points of a same category but far away in a high-dimensional space to become closer after being mapped to a low-dimensional space by the contrastive loss, and points of different categories but close to each other to become further in the low-dimensional space after being mapped. As a result, in low-dimensional space, points of a same kind may produce a clustering effect, and mean of different kinds may be separated. It is similar to fisher dimension reduction, but fisher dimension reduction does not have an effect of out-of-sample extension and cannot affect a new sample.

6) "Model training" means performing multi-classification learning on image data sets. The model may be constructed by deep learning frameworks such as TensorFlow and torch, and a multi-classification model is formed using a multi-layer combination of neural network layers such as a convolutional neural network (CNN). Input to the model is a three-channel or original-channel matrix formed after an image is read by a tool such as openCV. Output from the model is multi-classification probability. A web page category is finally outputted through an algorithm such as softmax. During training, the model approximates to a correct trend through an objective function such as cross entropy.

7) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

8) A "client" is a carrier to achieve a specific function in a terminal. For example, a mobile client (APP) is a carrier of a specific function in a mobile terminal, such as a program to perform a user gesture recognition function.

9) Soft max is a normalized exponential function that is a promotion of a logic function. The function can "compress" a K-dimension vector including any real number into another K-dimension real vector, so that each element ranges within (0, 1), and a sum of all elements is 1.

FIG. 1 is a schematic diagram of an application environment of a gesture recognition model according to an embodiment of this application. As shown in FIG. 1, a terminal (including a terminal 10-1 and a terminal 10-2) is provided with a client for gesture recognition, which may acquire electromyography samples of different users. When a human performs different gestures, a muscle group may produce different electromyography signals under the coordination of a nervous system. An sEMG records bioelectrical signals on skin surfaces of human muscles and effectively captures information of muscle activities. Intentions of human gestures may be decoded through gesture analysis on the surface electromyograph. The terminal is connected to a server 200 by using a network 300. The network 300 may be a wide area network, a local area network, or a combination of the wide area network and the local area network, and achieves data transmission by using a radio link. Certainly, the terminal 10-1 and the terminal 10-2 may also function as powered skeletons or somatosensory game machines with a gesture recognition model run therein. Surface electromyography signals are transmitted, decoded and controlled by embedding the gesture recognition model into different hardware systems or software systems. For example, 1) medical systems combined with powered exoskeletons may be configured for active rehabilitation of arm motor functions in patients with hemiplegia and spinal cord injuries. 2) Monitoring systems combined with physical training may evaluate muscle fatigue, balance and use efficiency in real time to improve training efficiency and reduce training injuries. 3) Gesture interaction systems combined with games enable humans to control activities of objects in the virtual world through gesture movement.

Gesture information obtained by the terminal (including the terminal 10-1 and the terminal 10-2) from a corresponding server 200 via a network 300 is of different types. For example, the terminal (including the terminal 10-1 and the terminal 10-2) may either obtain any type of gesture information from the corresponding server 200 via the network 300 or obtain gesture information only matching a corresponding control instruction from the corresponding server 200 through the network 300 for execution. In some embodiments of this application, different types of gesture information stored in the server 200 may be written in software code environments of different programming languages, and code objects may be different types of code entities. For example, in C language software code, a code object may be a function. In JAVA language software code, a code object may be a class, which may be a piece of object code in IOS OC language. In C++ language software code, a code object may be a class or a function to perform electromyography signals from different terminals. Sources of gesture information to be processed by the gesture recognition model are not distinguished from one another in this application.

The server 200 needs to determine and recognize electromyography signals generated during gesture triggering when the server 200 sends different types of gesture information to the terminal (including the terminal 10-1 and the terminal 10-2) via the network 300. As an instance, the server 200 is configured to obtain different electromyography signals of a same target object and denoise the different electromyography signals; recognize the denoised different electromyography signals based on the gesture information label through the gesture recognition model, and determine probabilities of gesture information represented by the different electromyography signals; and weight the probabilities of the gesture information represented by the different electromyography signals, so as to determine gesture information matching the target object.

Certainly, before the gesture recognition model run in the server 200 is used, the corresponding gesture recognition model further needs to be trained, so as to deploy the trained gesture recognition model in a corresponding server. Specifically, a process of training the gesture recognition model includes: obtaining a first training sample set, where the first training sample set includes at least one group of electromyography signal samples and the corresponding gesture information label; denoising the first training sample set, so as to form a corresponding second training sample set; determining initial parameters of the first neural network model in the gesture recognition model; processing the second training sample set through the gesture recognition model based on the initial parameters of the first neural network model, and determining update parameters corresponding to different neural networks of the gesture recognition model; and iteratively updating parameters of the first neural network model of the gesture recognition model through the second training sample set according to the update parameters corresponding to the different neural networks of the gesture recognition model, so as to recognize different gesture information through the gesture recognition model.

Figure 2:
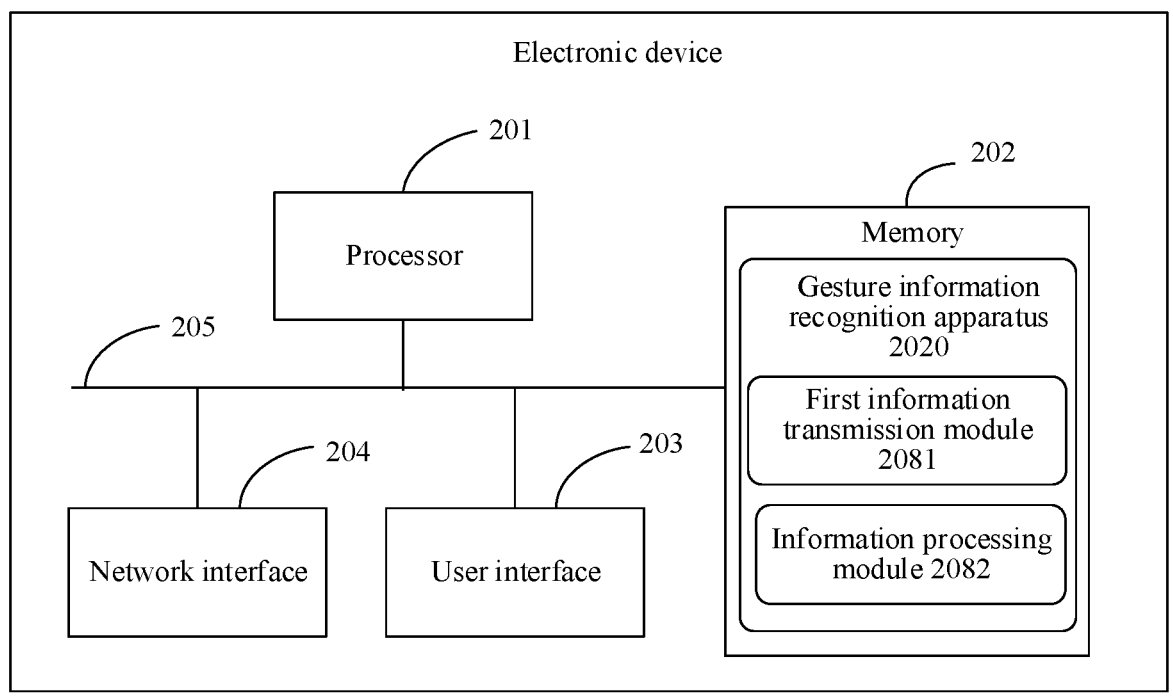
FIG. 2 is a schematic structural diagram of composition of an electronic device according to an embodiment of this application.

A structure of an electronic device according to an embodiment of this application is described in detail below. The electronic device may be implemented in a variety of forms, for example, a dedicated terminal with a gesture information recognition function, or an electronic device with a gesture information recognition function, such as the server 200 in FIG. 1. FIG. 2 is a schematic structural diagram of composition of an electronic device according to an embodiment of this application. It may be understood that, FIG. 2 shows only an exemplary structure rather than a complete structure of the electronic device. The structure shown in FIG. 2 may be partially or entirely implemented based on requirements.

The electronic device provided in this embodiment of this application includes: at least one processor 201, a memory 202, a user interface 203, and at least one network interface 204. The components in the electronic device are coupled by using a bus system 205. It may be understood that the bus system 205 is configured to implement connection and communication between the components. In addition to a data bus, the bus system 205 further includes a power bus, a control bus, and a state signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in the embodiment of this application can store data to support operation of the terminal (for example, 10-1). An example of the data includes any computer program to be operated on the terminal (for example, 10-1), for example, an operating system and an application program. The operating system includes various system programs, such as framework layers, kernel library layers, and driver layers used for implementing various basic services and processing hardware-based tasks. The application program may include various application programs.

In some embodiments, a gesture information recognition apparatus provided in the embodiments of this application may be implemented in the form of a combination of software and hardware. In an example, the gesture information recognition apparatus provided in the embodiments of this application may be a processor in the form of a hardware decoding processor, and is programmed to execute the gesture information recognition method provided in the embodiments of this application. For example, the processor in the form of a hardware decoding processor may use one or more ASICs, digital signal processor (DSP), programmable logic devices (PLDs), complex programmable logic device (CPLD), FPGAs, or other electronic elements.

In an example in which the gesture information recognition apparatus provided in the embodiments of this application is implemented by a combination of software and hardware, the gesture information recognition provided in the embodiments of this application may be directly embodied as a combination of software modules executed by the processor 201. The software modules may be located in a storage medium, and the storage medium is located in the memory 202. The processor 201 reads executable instructions included in the software modules in the memory 202 and uses necessary hardware (for example, including the processor 201 and other components connected to the bus 205) in combination, to complete the gesture information recognition method provided in the embodiments of this application.

For example, the processor 201 may be an integrated circuit chip, and has a signal processing capability, for example, a general purpose processor, a digital signal processor (DSP), or another programmable logical device, a discrete gate or a transistor logical device, or a discrete hardware component. The general purpose processor may be a microprocessor, any conventional processor, or the like.

In an example in which the gesture information recognition apparatus provided in the embodiments of this application is implemented by hardware, the gesture information recognition apparatus provided in the embodiments of this application may be directly executed by using the processor 201 in the form of a hardware decoding processor, for example, one or more ASICs, DSPs, PLDs, CPLDs, FPGAs, or other electronic elements, to execute the gesture information recognition method provided in the embodiments of this application.

The memory 202 in this embodiment of this application is configured to store various types of data to support operation of the electronic device. An example of the data includes: any executable instruction configured to be operated on the electronic device, such as an executable instruction, and a program that implements the gesture information recognition method of the embodiments of this application may be included in the executable instruction.

In some other embodiments, the gesture information recognition apparatus according to the embodiment of this application may be implemented in the form of software. FIG. 2 shows a gesture information recognition apparatus 2020 stored in the memory 202, which may be software in the form of a program, a plug-in, or the like, and include a series of modules. An example of the program stored in the memory 202 may include the gesture information recognition apparatus 2020. The gesture information recognition 2020 includes the following software modules: a first information transmission module 2081 and an information processing module 2082. When the software modules in the gesture information recognition apparatus 2020 are read into the RAM by the processor 201 and executed, the gesture information recognition method according to the embodiment of this application is performed. Functions of the software modules in the gesture information recognition apparatus 2020 are introduced below.

The information processing module 2082 is configured to determine an electromyography signal collection target object in a gesture information usage environment.

The first information transmission module 2081 is configured to acquire an electromyography signal sample matching the electromyography signal collection target object, and a corresponding gesture information label.

The information processing module 2082 is configured to divide the electromyography signal sample through a sliding window having a fixed window value and a fixed stride into different electromyography signals of the target object, and denoise the different electromyography signals of the target object.

The information processing module 2082 is configured to recognize the denoised different electromyography signals based on the gesture information label, and determine probabilities of gesture information represented by the different electromyography signals.

The information processing module 2082 is configured to weight the probabilities of the gesture information represented by the different electromyography signals, so as to determine gesture information matching the target object.

Figure 4:
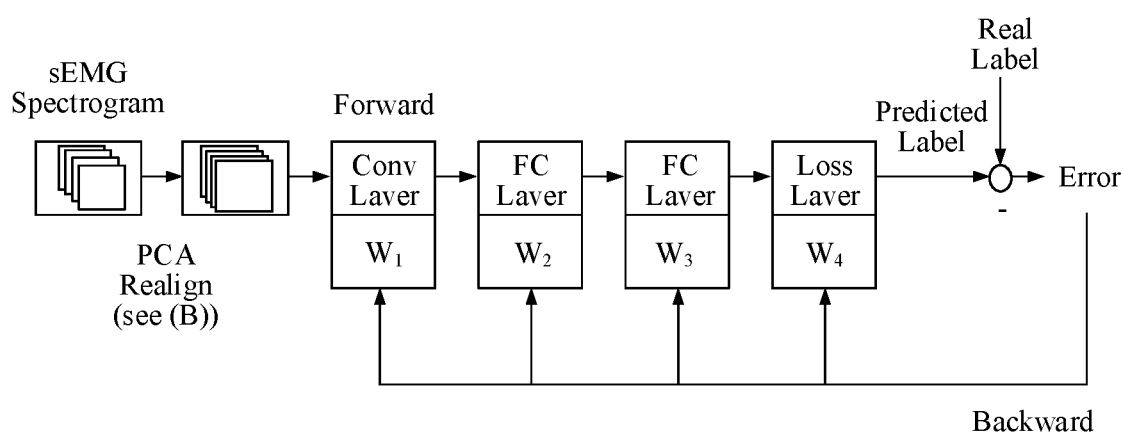
FIG. 4 is a schematic diagram of a process of generating gesture information in the conventional solution.

The gesture information processing method according to the embodiment of this application is described in combination with the gesture information recognition apparatus 2020 shown in FIG. 2. Before the gesture information processing method according to the embodiment of this application is introduced, a process of generating, by a gesture recognition model, corresponding gesture information based on electromyography signals in this application is introduced first. FIG. 3 is a schematic diagram of a process of generating gesture information in a conventional solution. In the related art, based on sEMG classification of PSD+ Shallow ConvNet, firstly, power spectral density (PSD) of original surface electromyography signals may be calculated to obtain a feature map; then, the feature map is used as network input, and temporal and spatial features are extracted from a PSD map by using a convolution module (a convolutional layer, a Batch Normalization layer, and a maximum pooling layer); finally, a corresponding classification probability is obtained through full connection and SoftMax. Alternatively, refer to FIG. 4 which is a schematic diagram of a process of generating gesture information in the conventional solution. Based on sEMG classification of fast Fourier transform (FFT)+principal component analysis (PCA)+CNN, first 25 principal components of a spectrogram of original signals are obtained by PCA based on the spectrogram, the spectrogram after dimension reduction is used as input to the CNN, and features therein are extracted using a convolutional layer. Finally, a corresponding classification probability is obtained through full connection and SoftMax. However, in the related art, an sEMG classification algorithm based on PSD+Shallow ConvNet requires manual extraction of feature information, so features that can be learned by the model are limited and not enough to fit complex sEMG signals. A classification algorithm based on FFT+PCA+CNN requires pre-extraction of FFT features and reduction of data dimensions by principal component analysis, which not only has a plurality of uncertain hyperparameters, but also results in inconsistent objectives of feature extraction and classification model optimization, and end-to-end signal decoding cannot be realized. At the same time, the relevant algorithms do not take continuity before and after gesture prediction into account, which may also lead to poor stability of real-time gesture prediction, affect recognition of continuous user gestures, and affect user experience.

Figure 5:
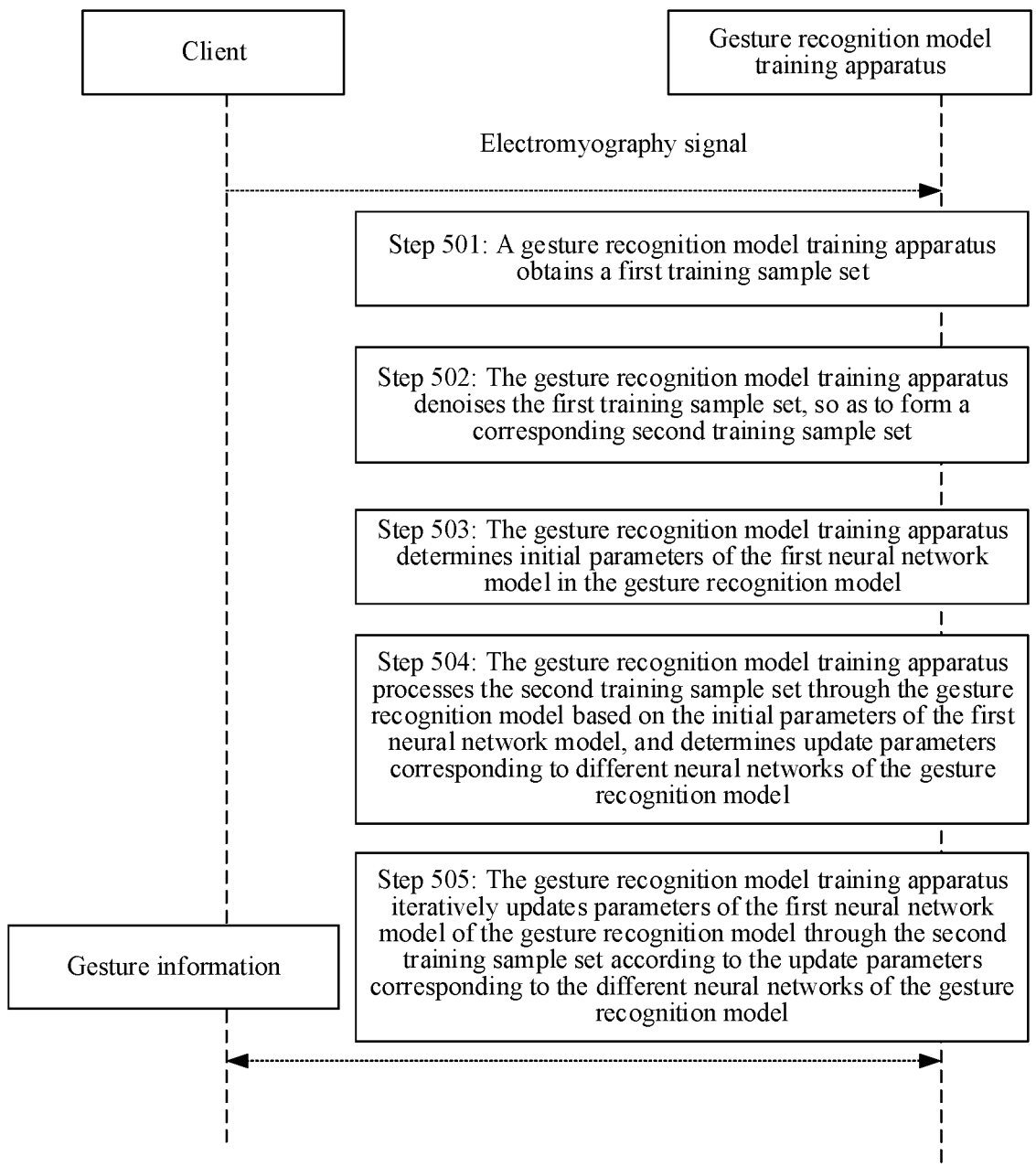
FIG. 5 is an exemplary schematic flowchart of a gesture information processing method according to an embodiment of this application.

In order to solve the above problem, referring to FIG. 5, the gesture information processing method according to the embodiment of this application is described with reference to the electronic device shown in FIG. 2. FIG. 5 is an exemplary schematic flowchart of a gesture information processing method according to an embodiment of this application. It may be understood that, steps shown in FIG. 5 may be performed by various electronic devices running the gesture information processing apparatus, such as a dedicated terminal, an electronic device, or an electronic device cluster with a gesture information recognition function. The following describes the steps shown in FIG. 5.

Step 501: A gesture information processing apparatus obtains a first training sample set.

The first training sample set includes at least one group of electromyography signal samples and the corresponding gesture information label.

Step 502: The gesture information processing apparatus denoises the first training sample set, so as to form a corresponding second training sample set.

In some embodiments of this application, the denoising the first training sample set, so as to form a corresponding second training sample set may be performed in following manners:

determining a dynamic noise threshold matching a usage environment of the gesture recognition model; and denoising the first training sample set according to the dynamic noise threshold, so as to form a second training sample set matching the dynamic noise threshold. Due to different usage environments of the gesture recognition model, the dynamic noise threshold matching the gesture recognition model also varies. For example, in a usage environment of a robotic arm in somatosensory game, a dynamic noise threshold matching gesture information to be recognized and executed by the terminal and the usage environment of the gesture recognition model is required to be greater than a dynamic noise threshold of a precision manipulator.

In some embodiments of this application, the denoising the first training sample set, so as to form a corresponding second training sample set may be performed in following manners:

determining a fixed noise threshold corresponding to the gesture recognition model, and denoising the first training sample set according to the fixed noise threshold, so as to form a second training sample set matching the fixed noise threshold. When the gesture recognition model is solidified in a corresponding hardware mechanism, such as a prosthetic system or a posture monitoring system, and the usage environment is large-gesture recognition and triggering, since noise is relatively single, a training speed of the gesture recognition model can be effectively increased, the user's waiting time can be shortened, and the user experience can be improved through the fixed noise threshold corresponding to the fixed gesture recognition model.

In some embodiments of this application, the gesture information processing method further includes:

determining a corresponding training sample collection object according to the usage environment of the gesture recognition model; acquiring an electromyography signal sample matching the training sample collection object, and a corresponding gesture information label; and dividing the electromyography signal sample through the sliding window having the fixed window value and the fixed stride to form the first training sample set. The corresponding training sample collection object is determined, and the electromyography signal sample matching the training sample collection object, and the corresponding gesture information label are acquired, so that the gesture recognition model to be used by a target in a specific field can be trained, so as to improve accuracy of the trained gesture recognition model.

Step 503: The gesture information processing apparatus determines initial parameters of the first neural network model in the gesture recognition model.

In some embodiments of this application, the determining initial parameters of the first neural network model in the gesture recognition model may be performed in following manners:

determining the output sizes of the different networks in the first neural network model of the gesture recognition model and the quantity of the corresponding convolution kernels according to features of electromyography signals in the first training sample set; and adjusting the quantities of the temporal convolutional layer network, the spatial convolutional layer network, the fully connected layer network and the residual module network of the first neural network model according to an application environment of the gesture recognition model, so as to match initialization parameters of the gesture recognition model with the application environment.

In some embodiments of this application, the gesture information processing method further includes:

determining a classification loss and a contrastive loss corresponding to the first neural network model in the gesture recognition model; and determining a fusion loss matching the gesture recognition model according to the classification loss and the contrastive loss, where the fusion loss is configured to stop training the gesture recognition model when a corresponding convergence condition is reached.

In some embodiments of this application, the first neural network model in the gesture recognition model may be a trained neural network, and the first neural network model in the gesture recognition model may be a large-scale neural network. For example, a quantity of network parameters of the first neural network model in the gesture recognition model is greater than a value, which is not limited in the embodiment of this application. Optionally, the first neural network model in the gesture recognition model may be a residual network (ResNet), a CNN, a deep neural network (DNN), a recurrent neural network (RNN) or the like. The type of the first neural network model in the gesture recognition model is not limited in the embodiment of this application. The first neural network model in the gesture recognition model may be a neural network suitable for different computer vision tasks, such as a target recognition task, a target classification task, a target detection task or an attitude estimation task. The first neural network model in the gesture recognition model may also be a neural network suitable for different application scenarios, such as a security monitoring scenario, a gesture unlocking scenario or an intelligent driving scenario. An application scope of the first neural network model in the gesture recognition model is not limited in the embodiment of this application. Optionally, A network structure of the first neural network model in the gesture recognition model may be designed according to computer vision tasks or adopt at least part of a related network structure, such as a DNN or a visual geometry group network (VGGNet). The network structure of the first neural network model in the gesture recognition model is not limited in the embodiment of this application.

In some embodiments of this application, since, in the related art, only softmax is used as a loss function of the model, but differences between signals of a same kind within individuals are not taken into account, in this application, a contrastive loss is applied to reduce the loss of the differences between the signals of the same kind and improve robustness of the algorithm. A second neural network model and a third neural network model may also be introduced to determine a classification loss function for evaluating gesture information classification and a contrastive loss of separability between inner classes of corresponding individuals respectively.

Step 504: The gesture information processing apparatus processes the second training sample set through the gesture recognition model based on the initial parameters of the first neural network model, and determines update parameters corresponding to different neural networks of the gesture recognition model.

Step 505: The gesture information processing apparatus iteratively updates parameters of the first neural network model of the gesture recognition model through the second training sample set according to the update parameters corresponding to the different neural networks of the gesture recognition model.

Thus, different gesture information can be recognized through the gesture recognition model.

Figure 6:
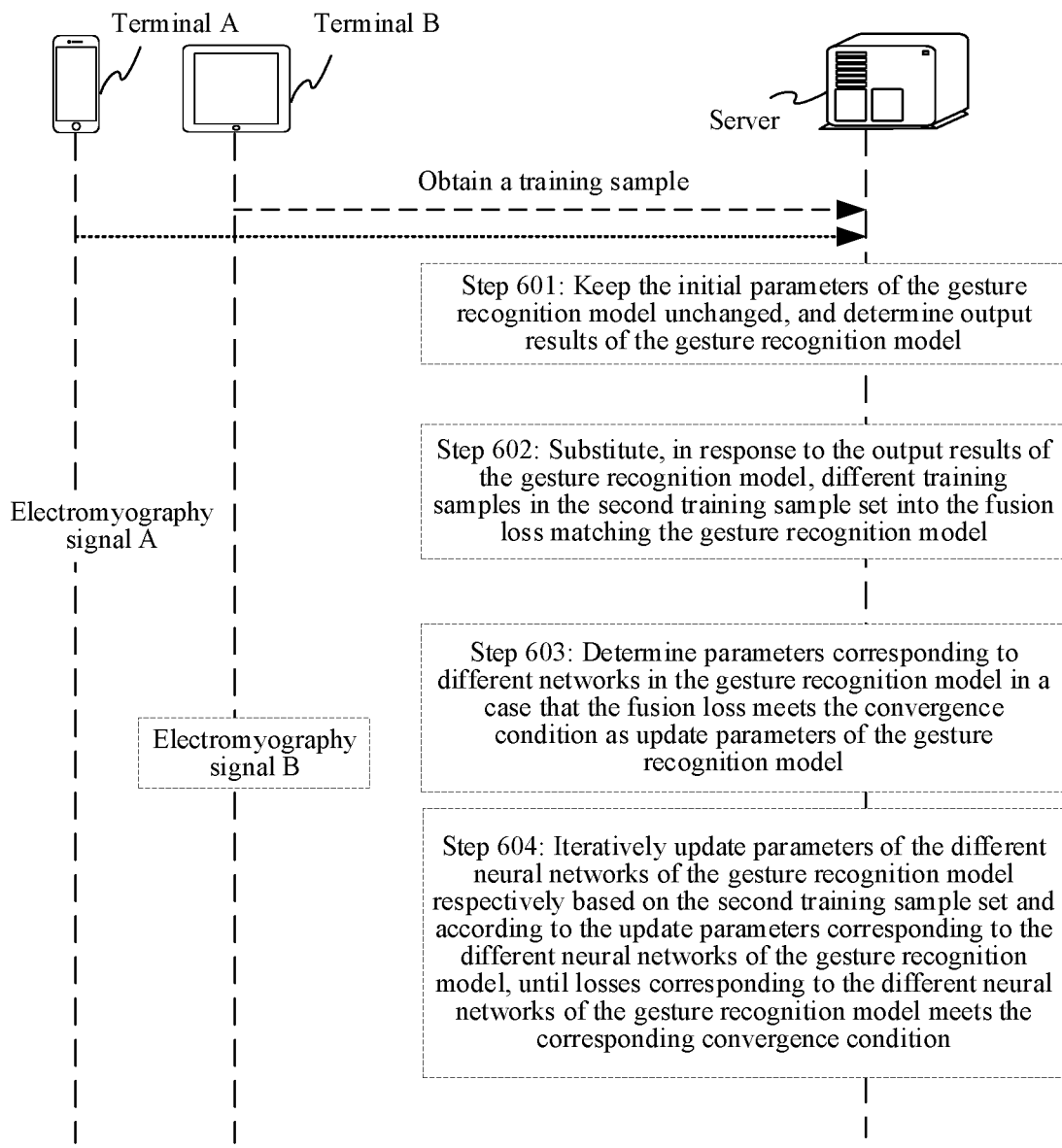
FIG. 6 is an exemplary schematic flowchart of the gesture information processing method according to an embodiment of this application.

Still referring to FIG. 6, the gesture information processing method according to the embodiment of this application is described with reference to the electronic device shown in FIG. 2. FIG. 6 is an exemplary schematic flowchart of the gesture information processing method according to an embodiment of this application. It may be understood that, steps shown in FIG. 6 may be performed by various electronic devices running the gesture information processing apparatus, such as a dedicated terminal, an electronic device, or an electronic device cluster with a gesture information recognition function. The following describes the steps shown in FIG. 6.

Step 601: Keep the initial parameters of the gesture recognition model unchanged, and determine output results of the gesture recognition model.

Step 602: Substitute, in response to the output results of the gesture recognition model, different training samples in the second training sample set into the fusion loss matching the gesture recognition model.

Step 603: Determine parameters corresponding to different networks in the gesture recognition model when the fusion loss meets the convergence condition as update parameters of the gesture recognition model.

Step 604: Iteratively update parameters of the different neural networks of the gesture recognition model respectively based on the second training sample set and according to the update parameters corresponding to the different neural networks of the gesture recognition model, until losses corresponding to the different neural networks of the gesture recognition model meets the corresponding convergence condition.

Figure 7:
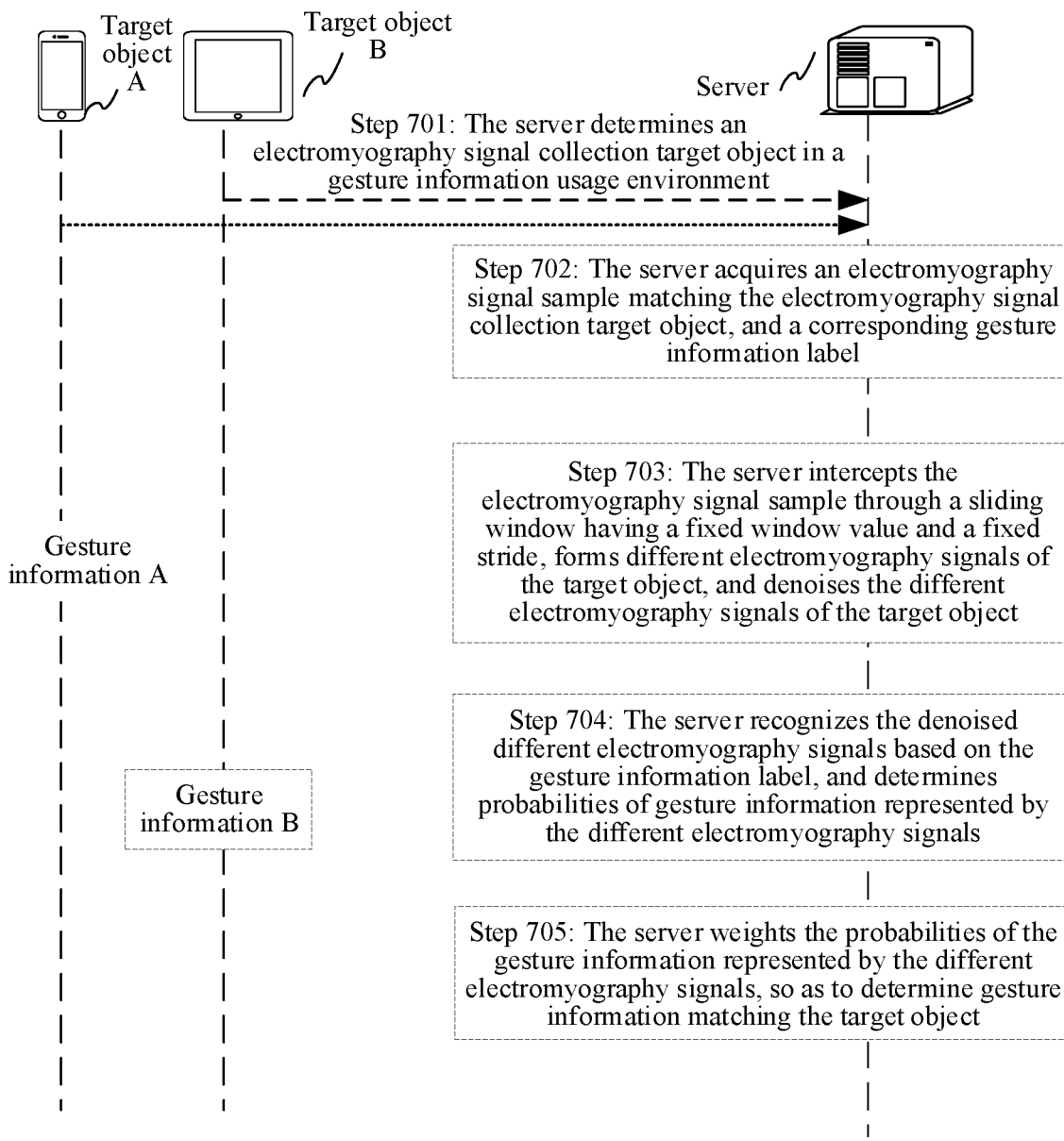
FIG. 7 is an exemplary schematic flowchart of a method of using the gesture recognition model according to an embodiment of this application.

Still referring to FIG. 7, the gesture information processing method according to the embodiment of this application is described with reference to the electronic device shown in FIG. 2. FIG. 7 is an exemplary schematic flowchart of a method of using the gesture recognition model according to an embodiment of this application. It may be understood that, steps shown in FIG. 7 may be performed by various electronic devices running the gesture recognition model, such as a dedicated terminal, an electronic device, or an electronic device cluster with a gesture information recognition function. The following describes the steps shown in FIG. 7.

Step 701: A server determines an electromyography signal collection target object in a gesture information usage environment of a gesture recognition model.

Step 702: The server acquires an electromyography signal sample matching the electromyography signal collection target object, and a corresponding gesture information label.

Step 703: The server divides the electromyography signal sample through a sliding window having a fixed window value and a fixed stride into different electromyography signals of the target object, and denoises the different electromyography signals of the target object.

Step 704: The server recognizes the denoised different electromyography signals based on the gesture information label, and determines probabilities of gesture information represented by the different electromyography signals.

Step 705: The server weights the probabilities of the gesture information represented by the different electromyography signals, so as to determine gesture information matching the target object.

In some embodiments of this application, the different electromyography signals of the target object may be obtained in following manners:

determining a corresponding electromyography signal collection object according to the usage environment of the gesture recognition model; acquiring an electromyography signal sample matching the electromyography signal collection object, and a corresponding gesture information label; and dividing the electromyography signal sample through the sliding window having the fixed window value and the fixed stride, to form different electromyography signals of the target object.

In some embodiments of this application, the denoising the different electromyography signals may be performed in following manners:

determining a dynamic noise threshold matching a usage environment of the gesture recognition model; and denoising the different electromyography signals according to the dynamic noise threshold, so as to form a dynamic noise electromyography signal matching the dynamic noise threshold. Certainly, a usage environment of fixed noise may also be realized in a following manner: determining a fixed noise threshold corresponding to the gesture recognition model, and denoising the different electromyography signals according to the fixed noise threshold, so as to form a fixed noise electromyography signal matching the fixed noise threshold. Due to different usage environments of the gesture recognition model, the dynamic noise threshold matching the gesture recognition model also varies. For example, in a usage environment of a robotic arm in somatosensory game, a dynamic noise threshold matching gesture information to be recognized and executed by the terminal and the usage environment of the gesture recognition model is required to be greater than a dynamic noise threshold of a precision manipulator.

In some embodiments of this application, features of corresponding electromyography signals are determined when a usage environment of the gesture recognition model is a powered skeleton. The output sizes of the different networks in the first neural network model of the gesture recognition model and the quantity of the corresponding convolution kernels are determined according to features of electromyography signals. The quantities of the temporal convolutional layer network, the spatial convolutional layer network, the fully connected layer network and the residual module network of the first neural network model are determined according to features of the powered skeleton, so as to match initialization parameters of the gesture recognition model with the features of the powered skeleton. Thus, the training time of the model may be shortened, and the trained model may be provided for users to directly call through an applet.

Thus, while real-time performance of recognition is ensured, weighted average is performed on consecutive N model classification probabilities to obtain a final output result, so that predictive output for a same gesture is more stable during practical application, improving the robustness of the gesture recognition model.

Figure 8:
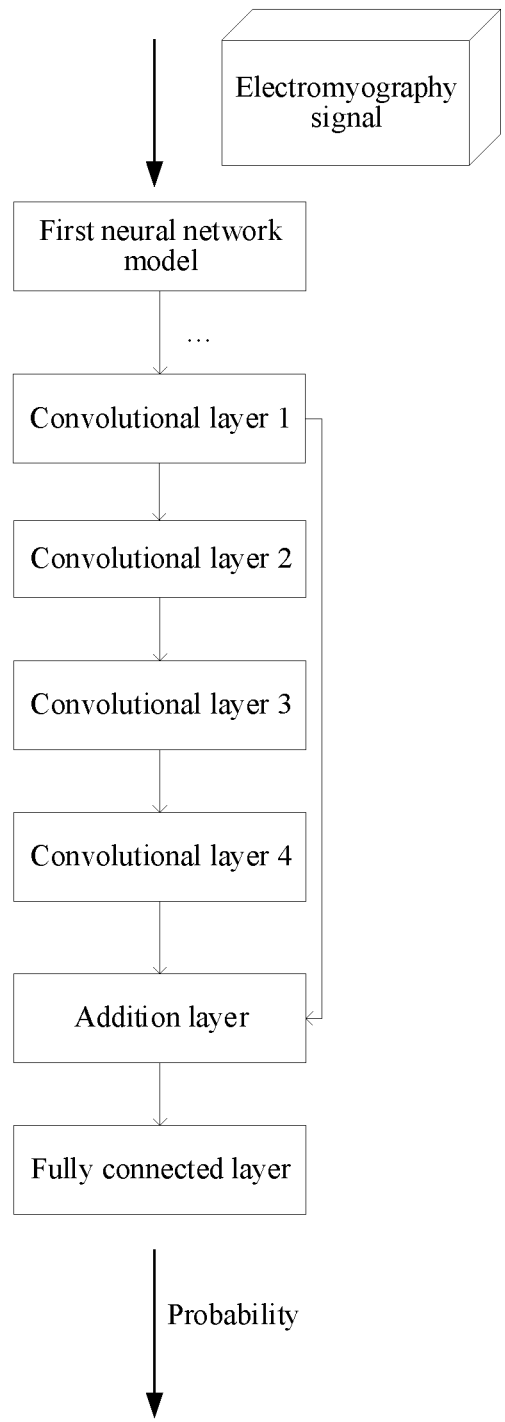
FIG. 8 is an exemplary schematic structural diagram of a first neural network model according to an embodiment of this application.

Still refer to FIG. 8 which is an exemplary schematic structural diagram of a first neural network model according to an embodiment of this application. The first neural network model is a full convolutional residual neural network, which successively includes four convolutional layers: convolutional layers 1 to 4. 17 serial residual blocks and an addition layer are included between the convolutional layer 1 and the convolutional layer 2, and output of the residual block 17 and output of the convolutional layer 1 serve as input to the addition layer.

Preliminary feature extraction is performed on an input image by using one convolutional layer 1, to obtain preliminarily extracted features. Feature extraction is continuously performed on the preliminarily extracted features by using the series residual blocks 1 to 17 and features and texture are supplemented to output of a previous residual block. The output of the residual block 17 is supplemented to the preliminarily extracted features through the addition layer. Resolution of an image outputted from the addition layer is amplified to super-resolution of a specified multiple by using series convolutional layers 2 and 3—pixel realignment layer—convolutional layer 4, to obtain a super-resolution image.

Figure 9:
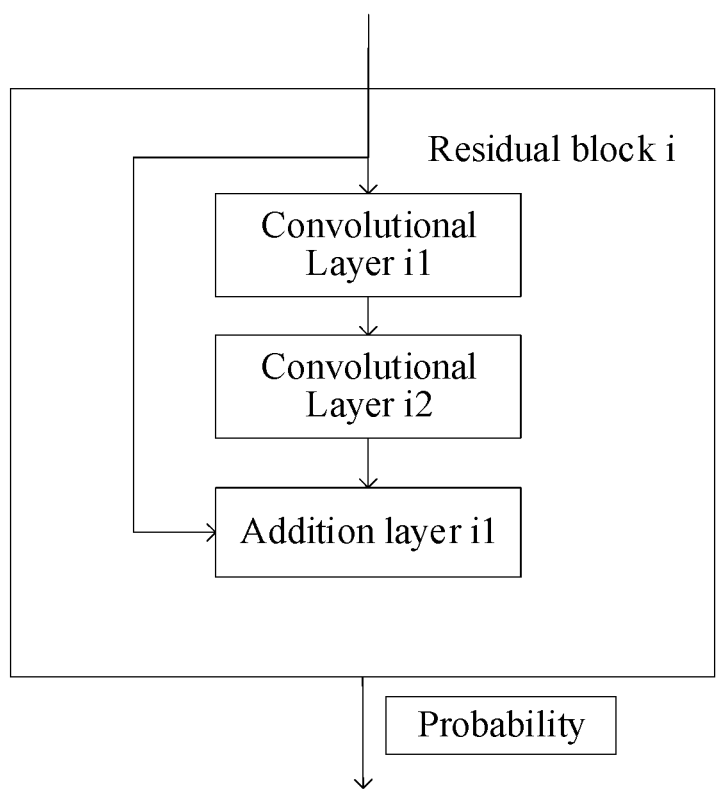
FIG. 9 is an exemplary schematic structural diagram of the first neural network model according to an embodiment of this application.

FIG. 9 is an exemplary schematic structural diagram of the first neural network model according to an embodiment of this application. A network structure of a residual block i is shown in FIG. 9, including a convolutional layer i1, a convolutional layer i2 and an addition layer i1 connected in series. $0<i<1$. The addition layer i1 adds input of residual block i1 to a corresponding element outputted from the convolutional layer i2, which is inputted to the following fully connected layer and processed by the fully connected layer and a normalized exponential function layer connected to the fully connected layer, to determine a probability that the electromyography signal belongs to the corresponding gesture information.

Figure 10:
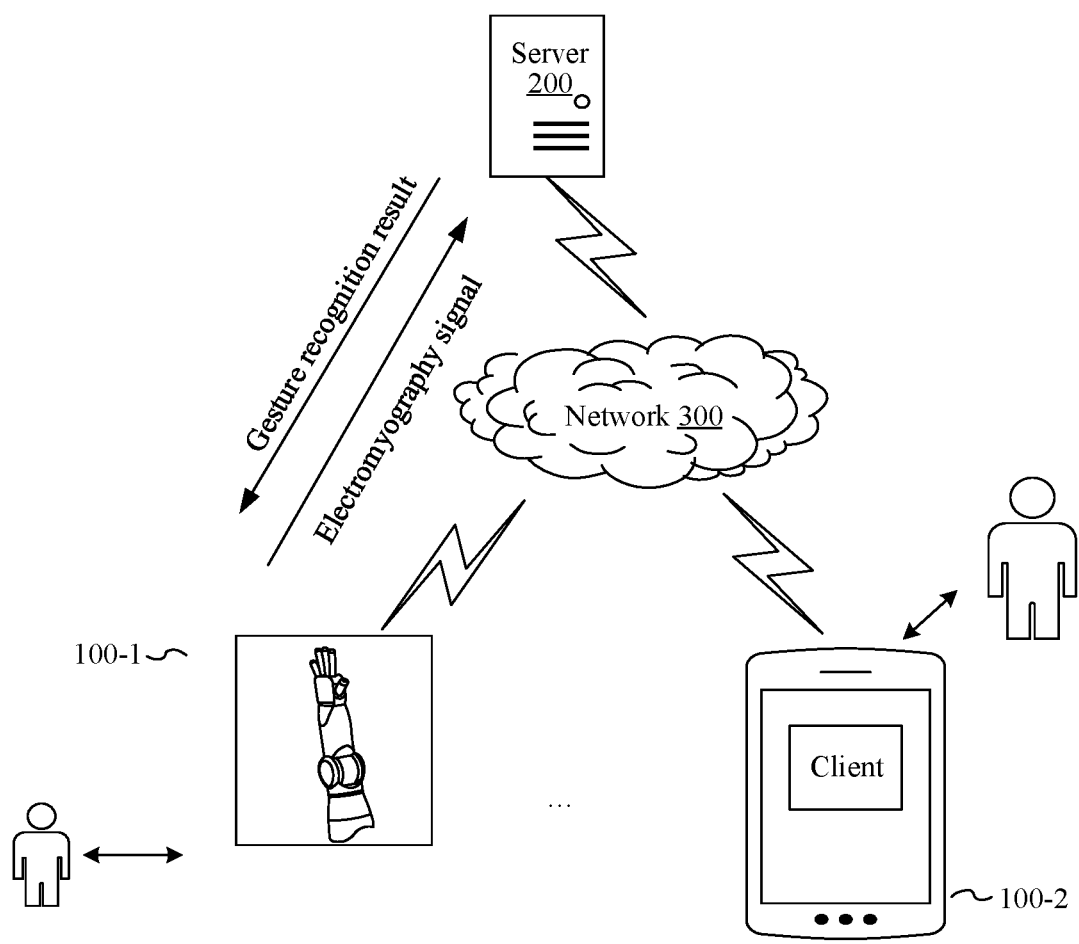
FIG. 10 is a schematic diagram of an application environment of the gesture recognition model according to an embodiment of this application.

The gesture recognition model according to the embodiment of this application is described below by taking a powered exoskeleton as an example. FIG. 10 is a schematic diagram of an application environment of the gesture recognition model according to an embodiment of this application. As shown in FIG. 10, a terminal (including a powered exoskeleton 100-1 and a terminal 100-2) is provided with a client for gesture recognition, which may acquire electromyography samples of different users. When a human performs different gestures, a muscle group may produce different electromyography signals under the coordination of a nervous system. An sEMG records bioelectrical signals on skin surfaces of human muscles and effectively captures information of muscle activities. Intentions of human gestures may be decoded through gesture analysis on the surface electromyograph. The terminal is connected to a server 200 via a network 300. The network 300 may be a wide area network, a local area network, or a combination thereof, and transmit data by using wireless links. Certainly, the terminal 10-1 and the terminal 10-2 may also function as powered skeletons or somatosensory game machines with a gesture recognition model run therein. Surface electromyography signals are transmitted, decoded and controlled by embedding the gesture recognition model into different hardware systems or software systems. For example, 1) medical systems combined with powered exoskeletons may be configured for active rehabilitation of arm motor functions in patients with hemiplegia and spinal cord injuries. 2) Monitoring systems combined with user posture monitoring may evaluate, in real time, fatigue, balance and use efficiency of muscles to which the powered exoskeleton is attached, improving training efficiency and reducing injuries of a target user.

Figure 11:
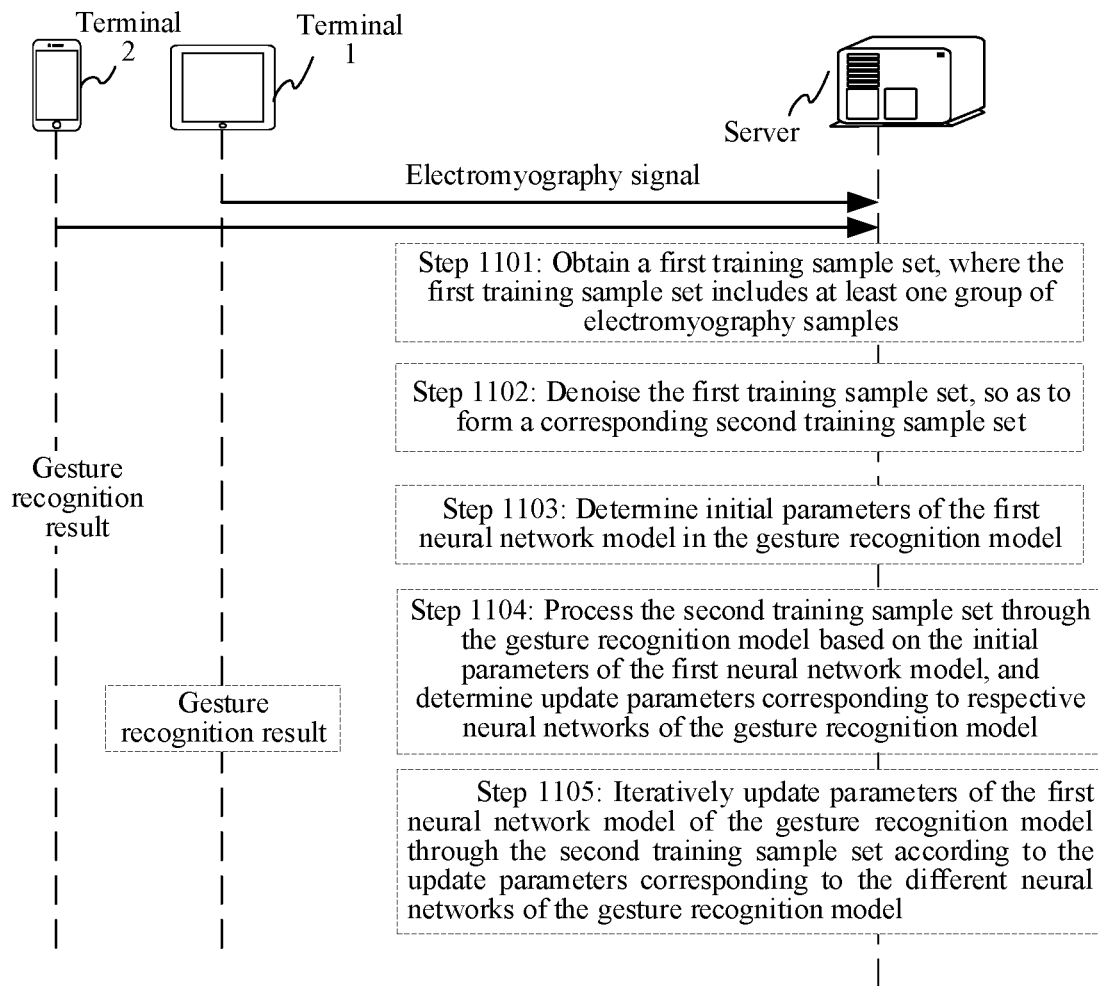
FIG. 11 is an exemplary schematic flowchart of the gesture information processing method according to an embodiment of this application.

Refer to FIG. 11 which is an exemplary schematic flowchart of the gesture information processing method according to an embodiment of this application, specifically including the following steps:

Step 1101: Obtain a first training sample set, where the first training sample set includes at least one group of electromyography samples.

Step 1102: Denoise the first training sample set, so as to form a corresponding second training sample set.

Figure 12:
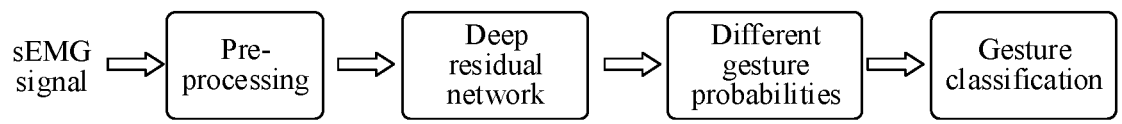
FIG. 12 is an exemplary schematic flowchart of the gesture information processing method according to an embodiment of this application.

Refer to FIG. 12 which is an exemplary schematic flowchart of the gesture information processing method according to an embodiment of this application. Original multichannel surface electromyography signals are preprocessed to obtain training samples, the training samples are then inputted into a deep residual network to extract features which mainly include time domain features and space domain features related to electromyography gestures, probabilities of different gestures are obtained and classified, and finally, network parameters are continuously optimized by iterative training.

Figure 13:
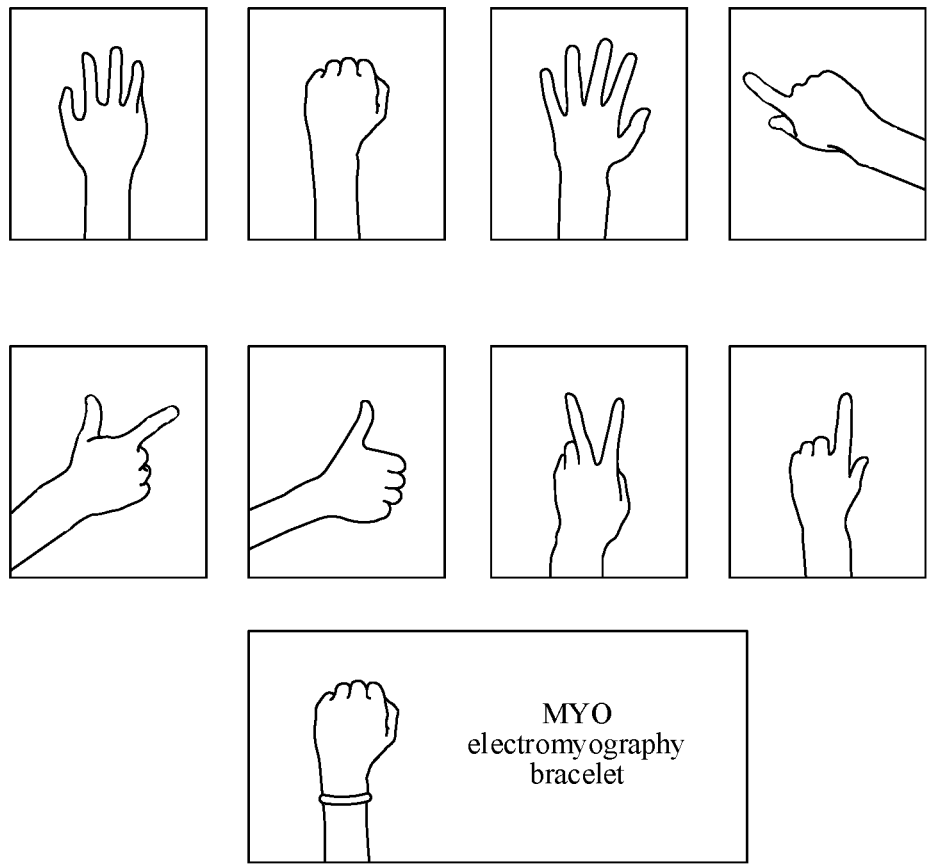
FIG. 13 is an exemplary schematic diagram of sample acquisition of the gesture recognition model according to an embodiment of this application.

Refer to FIG. 13 which is an exemplary schematic diagram of sample acquisition of the gesture recognition model according to an embodiment of this application. Cortical electromyography data of a target user may be obtained by a corresponding acquisition device. The data set includes electromyography data acquired by 10 subjects (e.g., 5 males and 5 females) in two time periods. The electromyography data in the first time period is used as a training sample data set, and the electromyography data in the second time period is used as a test sample data set.

In some embodiments of this application, a data acquisition process is as follows:

1) A subject sit in a chair and remains relaxed, wears an acquisition apparatus (e.g., an MYO electromyography bracelet), and lets arms hang down naturally. An experimenter informs the subject of the data acquisition process and specifications.

2) During data acquisition, the subject is required to perform eight different gestures as prompted, including "relax", "clench", "open hand", "swing left", "swing right", "give a like", "give a peace sign" and "index finger up" (as shown below). Each action lasts for 2 s, and a corresponding gesture label is recorded.

In some embodiments of this application, surface electromyography signals may be divided by a sliding window as a single sample to be sent to the network. A time window is 200 ms, and a window sliding stride is 40 ms. Since a signal sampling frequency is 200 Hz and 8 electrode channels are included, each signal sample has a dimension of 8×40.

Step 1103: Determine initial parameters of the first neural network model in the gesture recognition model.

Figure 14:
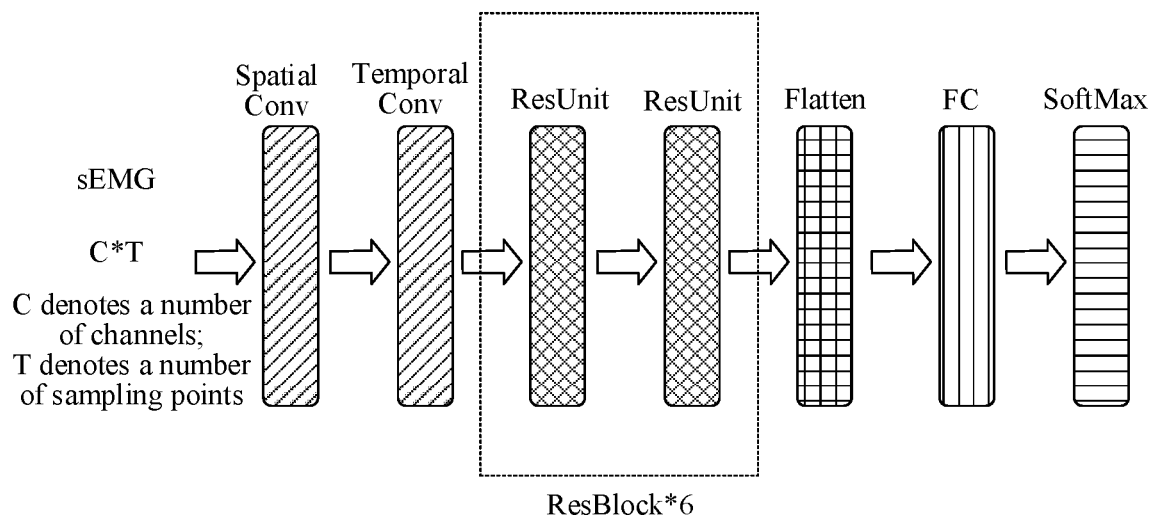
FIG. 14 is an exemplary schematic structural diagram of the gesture recognition model according to an embodiment of this application.

Refer to FIG. 14 which is an exemplary schematic structural diagram of the gesture recognition model according to an embodiment of this application. The first neural network model may be a ResNet. In the first neural network model, according to temporal and spatial properties, an inputted sEMG signal is processed by a spatial convolutional layer for the spatial properties and a temporal convolutional layer for the temporal properties. Model parameters of the first neural network model are shown in Table 1. The signal inputted to the network has a dimension of 8×40. First two temporal-spatial convolutional layers Spatial Conv and Temporal Conv perform convolutional operations on the signal in a spatial (channel) dimension and a temporal dimension respectively, with strides of 1, to realize spatial and temporal filtering of the sEMG signal. After temporal-spatial convolution, one-dimensional time features are outputted and are subsequently feature-extracted and fused by 6 residual modules. Each residual module includes two residual networks. Each residual network is formed by a convolutional layer with a 1*3 convolutional kernel and a batch normalization layer. Finally, the features are further fused through the fully connected layer, and classification results of electromyography gestures are outputted by Soft-Max.

In practical application, the network structure of the solution may be realized by appropriately increasing a quantity of the temporal and spatial convolutional layers, increasing a number of the fully connected layer, increasing a quantity of the residual modules and modifying sizes of different convolutional kernels.

Further, during initialization, the model parameters are initialized by Xavier, and loss weights of electromyography gesture classification and the contrastive loss are 0.8 and 0.2, respectively. Margin used in the contrastive loss is 1.

TABLE 1

| Layer name | Output size | Net |
| --- | --- | --- |
| Input | 8 × 40 | — |
| Spatial Conv | 1 × 40 | 8 × 1, 128, stride 1 × 1 |
| Temporal Conv | 1 × 18 | 1 × 5, 256, stride 1 × 2 |
| ResBlock1 | 1 × 18 | 1 × 3, 128, stride 1 × 1 |
| ResBlock2 | 1 × 18 | 1 × 3, 64, stride 1 × 1 |
| ResBlock3 | 1 × 9 | 1 × 3, 64, stride 1 × 2 |
| ResBlock4 | 1 × 9 | 1 × 3, 64, stride 1 × 1 |
| ResBlock5 | 1 × 9 | 1 × 3, 64, stride 1 × 1 |
| ResBlock6 | 1 × 9 | 1 × 3, 64, stride 1 × 1 |
| Flatten | 576 | — |
| Fully connected | 5 | 5 |
| Output | 5 | 5 |

Step 1104: Process the second training sample set through the gesture recognition model based on the initial parameters of the first neural network model, and determine update parameters corresponding to respective neural networks of the gesture recognition model.

Step 1105: Iteratively update parameters of the first neural network model of the gesture recognition model through the second training sample set according to the update parameters corresponding to the different neural networks of the gesture recognition model, so as to recognize different gesture information through the gesture recognition model.

In the related art, only a softmax loss is used as a loss function of the model, but differences between signals of a same kind within individuals are not taken into account. Therefore, in this application, a contrastive loss is applied to reduce the loss of the differences between the signals of the same kind and improve robustness of the algorithm.

Based on the above, the model loss of the technical solution is mainly divided into two parts: a classification loss for evaluating gesture classification; and a contrastive loss for increasing separability between inner classes within an individual. A loss function of the whole network model is:

$$L = \alpha L_{emg} + \beta L_{cont}$$

where $L_{emg}$ is softmax loss $= -\Sigma_i^c t_i \log(s_i)$.

$L_{emg}$ is a loss function that constrains a feature distance of a sample pair. By minimizing the loss function, feature distribution between sample pairs of a same kind may be as close as possible, while feature distances of sample pairs of different kinds exceed a certain margin. According to the above rule, a mathematical expression thereof is:

$$L_{cont} = \frac{1}{2N}\sum_{n=1}^{N} yd^2 + (1-y)\max(\text{margin} - d, 0)^2$$

where d denotes a Euclidean distance between two samples, and N denotes a total number of sample pairs. Loss functions that measure feature distances between classes and within classes may also be generalized to other losses, for example, different feature distances (such as cosine distances), or different metric functions such as a maximum mean error, a hinge loss and a triplet loss.

During the training, all sEMG data and gesture labels thereof may be sent to the network for learning, and the model may be optimized through error back propagation until the loss function meets a corresponding convergence condition.

Figure 15:
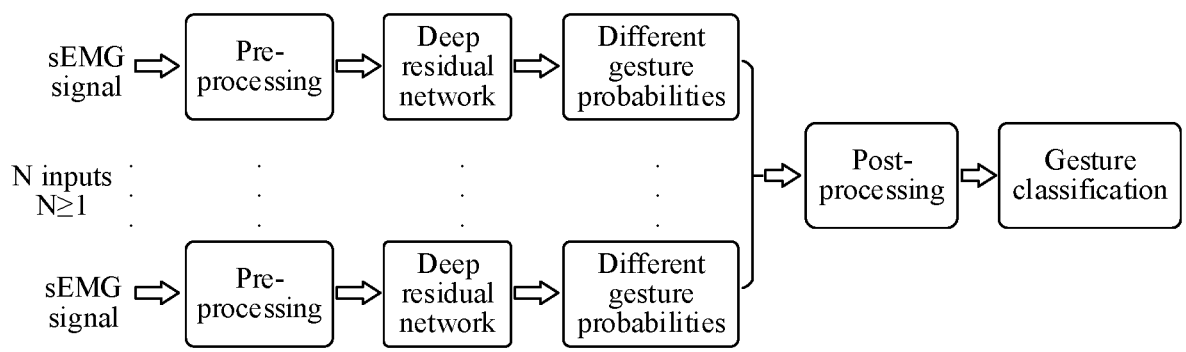
FIG. 15 is an exemplary schematic flowchart of a process of using the gesture recognition model according to an embodiment of this application.

Refer to FIG. 15 which is an exemplary schematic flow-chart of a process of using the gesture recognition model according to an embodiment of this application. In order to ensure real-time performance of electromyography recognition, electromyography data samples sent into the model for classification each time generally have a length ranging from 200 ms to 1 s. In an electromyography gesture decoding scheme of the related art, only each classification result is outputted, but in an actual process, a same gesture is often predicted unstably, especially in an early stage of the recognition. Thus, as shown in FIG. 15, while real-time performance of recognition is ensured, weighted average is performed on consecutive N model classification probabilities to obtain a final output result, so that predictive output for a same gesture is more stable during practical application.

Compared with recognition of gesture information in the conventional art, through the technical solutions according to this application, end-to-end decoding classification may be performed on electromyography signals, and decoding results may be directly obtained by inputting original signals, which only needs to be driven by input data, without a need to manually design prior knowledge of feature extraction.

The electromyography signals are divided by the sliding window with coincidence, so that consecutive signal samples have certain signal repetition and feature coincidence, and post-processing makes prediction results have higher consistency through a voting mechanism.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely exemplary embodiments of this application, but are not intended to limit this application. Any modification, equivalent replacement and improvement made within the spirit and principle of this application shall fall within the protection scope of this application.

Industrial Practicability

In the embodiments of this application, an electromyography signal collection target object in a gesture information usage environment is determined. An electromyography signal sample matching the electromyography signal collection target object, and a corresponding gesture information label are acquired. The electromyography signal sample is divided through a sliding window having a fixed window value and a fixed stride, different electromyography signals of the target object are formed, and the different electromyography signals of the target object are denoised. The denoised different electromyography signals are recognized based on the gesture information label, and probabilities of gesture information represented by the different electromyography signals are determined. The probabilities of the gesture information represented by the different electromyography signals are weighted, so as to determine gesture information matching the target object.

What is claimed is:

1. A gesture information processing method performed by an electronic device, the method comprising:
   acquiring an electromyography signal sample generated by an electromyography signal collection target object in connection with performing one of multiple gestures and a corresponding gesture information label;
   dividing the electromyography signal sample through a sliding window having a fixed window value and a fixed stride into different electromyography signals of the target object; and
   applying the different electromyography signals to a first neural network model to determine gesture information matching the one of multiple gestures performed by the target object, further including:
   recognizing the different electromyography signals based on the gesture information label;
   determining probabilities of gesture information represented by the different electromyography signals using the first neural network model; and
   weighting the probabilities of the gesture information represented by the different electromyography signals to determine the gesture information matching the one of multiple gestures performed by the target object.

2. The method of claim 1, wherein method further comprises:
   determining a dynamic noise threshold associated with the multiple gestures performed by the target object; and
   denoising the different electromyography signals according to the dynamic noise threshold to form dynamic noise electromyography signals matching the dynamic noise threshold.

3. The method of claim 1, wherein the method further comprises:

determining features of corresponding electromyography signals when the gesture information usage environment of the gesture recognition model is a powered skeleton;
determining output sizes of different networks in a first neural network model of the gesture recognition model and a quantity of corresponding convolution kernels according to the features of the electromyography signals; and
adjusting quantities of a temporal convolutional layer network, a spatial convolutional layer network, a fully connected layer network and a residual module network of the first neural network model according to features of the powered skeleton, so as to match initialization parameters of the gesture recognition model with the features of the powered skeleton.

4. The method of claim 1, wherein the first neural network model is trained by:
   obtaining a first training sample set, wherein the first training sample set comprises at least one group of electromyography signal samples and a corresponding set of gesture information labels;
   determining initial parameters of the first neural network model in the gesture recognition model;
   iteratively updating the initial parameters of the first neural network model by applying the first training sample set to the first neural network model according to the updated parameters of the first neural network model until after a loss function associated with the first neural network model meets a corresponding convergence condition.

5. The method of claim 4, wherein the first training sample set is generated by:
   acquiring an electromyography signal sample matching a training sample collection object and a corresponding set of gesture information labels; and
   dividing the electromyography signal sample through the sliding window having the fixed window value and the fixed stride to form the first training sample set.

6. The method of claim 4, wherein the determining initial parameters of the first neural network model comprises:
   determining the output sizes of different networks in the first neural network model and the quantity of the corresponding convolution kernels according to features of electromyography signals in the first training sample set; and
   adjusting the quantities of the different networks in the first neural network model including a temporal convolutional layer network, a spatial convolutional layer network, a fully connected layer network and a residual module network according to an application environment of the gesture recognition model, so as to match initialization parameters of the gesture recognition model with the application environment.

7. The method of claim 4, wherein the iteratively updating the initial parameters of the first neural network model further comprises:
   determining a classification loss and a contrastive loss corresponding to the first neural network model;
   determining a fusion loss matching the first neural network model according to the classification loss and the contrastive loss as the loss function associated with the first neural network model; and
   training the first neural network model by applying the first training sample set to the first neural network model according to the updated parameters of the first neural network model iteratively until after the fusion loss indicates that the corresponding convergence condition is reached.

8. An electronic device, comprising:
a memory configured to store executable instructions; and
a processor configured to run the executable instructions stored in the memory to perform a gesture information processing method including:
acquiring an electromyography signal sample generated by an electromyography signal collection target object in connection with performing one of multiple gestures and a corresponding gesture information label;
dividing the electromyography signal sample through a sliding window having a fixed window value and a fixed stride into different electromyography signals of the target object; and
applying the different electromyography signals to a first neural network model to determine gesture information matching the one of multiple gestures performed by the target object, further including:
recognizing the different electromyography signals based on the gesture information label;
determining probabilities of gesture information represented by the different electromyography signals using the first neural network model; and
weighting the probabilities of the gesture information represented by the different electromyography signals to determine the gesture information matching the one of multiple gestures performed by the target object.

9. The electronic device of claim 8, wherein method further comprises:
determining a dynamic noise threshold associated with the multiple gestures performed by the target object; and
denoising the different electromyography signals according to the dynamic noise threshold to form dynamic noise electromyography signals matching the dynamic noise threshold.

10. The electronic device of claim 8, wherein the method further comprises:
determining features of corresponding electromyography signals when the gesture information usage environment of the gesture recognition model is a powered skeleton;
determining output sizes of different networks in a first neural network model of the gesture recognition model and a quantity of corresponding convolution kernels according to the features of the electromyography signals; and
adjusting quantities of a temporal convolutional layer network, a spatial convolutional layer network, a fully connected layer network and a residual module network of the first neural network model according to features of the powered skeleton, so as to match initialization parameters of the gesture recognition model with the features of the powered skeleton.

11. The electronic device of claim 8, wherein the first neural network model is trained by:
obtaining a first training sample set, wherein the first training sample set comprises at least one group of electromyography signal samples and a corresponding set of gesture information labels;
determining initial parameters of the first neural network model in the gesture recognition model;
iteratively updating the initial parameters of the first neural network model by applying the first training sample set to the first neural network model according to the updated parameters of the first neural network model until after a loss function associated with the first neural network model meets a corresponding convergence condition.

12. The electronic device of claim 11, wherein the first training sample set is generated by:
acquiring an electromyography signal sample matching a training sample collection object and a corresponding set of gesture information labels; and
dividing the electromyography signal sample through the sliding window having the fixed window value and the fixed stride to form the first training sample set.

13. The electronic device of claim 11, wherein the determining initial parameters of the first neural network model comprises:
determining the output sizes of different networks in the first neural network model and the quantity of the corresponding convolution kernels according to features of electromyography signals in the first training sample set; and
adjusting the quantities of the different networks in the first neural network model including a temporal convolutional layer network, a spatial convolutional layer network, a fully connected layer network and a residual module network according to an application environment of the gesture recognition model, so as to match initialization parameters of the gesture recognition model with the application environment.

14. The electronic device of claim 11, wherein the iteratively updating the initial parameters of the first neural network model further comprises:
determining a classification loss and a contrastive loss corresponding to the first neural network model;
determining a fusion loss matching the first neural network model according to the classification loss and the contrastive loss as the loss function associated with the first neural network model; and
training the first neural network model by applying the first training sample set to the first neural network model according to the updated parameters of the first neural network model iteratively until after the fusion loss indicates that the corresponding convergence condition is reached.

15. A non-transitory computer-readable storage medium, storing executable instructions that, when executed by a processor of an electronic device, cause the electronic device to perform a gesture information processing method including:
acquiring an electromyography signal sample generated by an electromyography signal collection target object in connection with performing one of multiple gestures and a corresponding gesture information label;
dividing the electromyography signal sample through a sliding window having a fixed window value and a fixed stride into different electromyography signals of the target object; and
applying the different electromyography signals to a first neural network model to determine gesture information matching the one of multiple gestures performed by the target object, further including:
recognizing the different electromyography signals based on the gesture information label;
determining probabilities of gesture information represented by the different electromyography signals using the first neural network model; and weighting the probabilities of the gesture information represented by the different electromyography signals to determine the gesture information matching the one of multiple gestures performed by the target object.

16. The non-transitory computer-readable storage medium of claim 15, wherein method further comprises:
determining a dynamic noise threshold associated with the multiple gestures performed by the target object; and
denoising the different electromyography signals according to the dynamic noise threshold to form dynamic noise electromyography signals matching the dynamic noise threshold.

17. The non-transitory computer-readable storage medium of claim 15, wherein the method further comprises:
determining features of corresponding electromyography signals when the gesture information usage environment of the gesture recognition model is a powered skeleton;
determining output sizes of different networks in a first neural network model of the gesture recognition model and a quantity of corresponding convolution kernels according to the features of the electromyography signals; and
adjusting quantities of a temporal convolutional layer network, a spatial convolutional layer network, a fully connected layer network and a residual module network of the first neural network model according to features of the powered skeleton, so as to match initialization parameters of the gesture recognition model with the features of the powered skeleton.

18. The non-transitory computer-readable storage medium of claim 15, wherein the first neural network model is trained by:
obtaining a first training sample set, wherein the first training sample set comprises at least one group of electromyography signal samples and a corresponding set of gesture information labels;
determining initial parameters of the first neural network model in the gesture recognition model;
iteratively updating the initial parameters of the first neural network model by applying the first training sample set to the first neural network model according to the updated parameters of the first neural network model until after a loss function associated with the first neural network model meets a corresponding convergence condition.

19. The non-transitory computer-readable storage medium of claim 18, wherein the first training sample set is generated by:
acquiring an electromyography signal sample matching a training sample collection object and a corresponding set of gesture information labels; and
dividing the electromyography signal sample through the sliding window having the fixed window value and the fixed stride to form the first training sample set.

20. The non-transitory computer-readable storage medium of claim 18, wherein the iteratively updating the initial parameters of the first neural network model further comprises:
determining a classification loss and a contrastive loss corresponding to the first neural network model;
determining a fusion loss matching the first neural network model according to the classification loss and the contrastive loss as the loss function associated with the first neural network model; and
training the first neural network model by applying the first training sample set to the first neural network model according to the updated parameters of the first neural network model iteratively until after the fusion loss indicates that the corresponding convergence condition is reached.

* * * * *